A. C. VAN HOOYDONK.
TROLLEY RETRIEVER.
APPLICATION FILED DEC. 18, 1919.
1,404,248.
Patented Jan. 24, 1922.
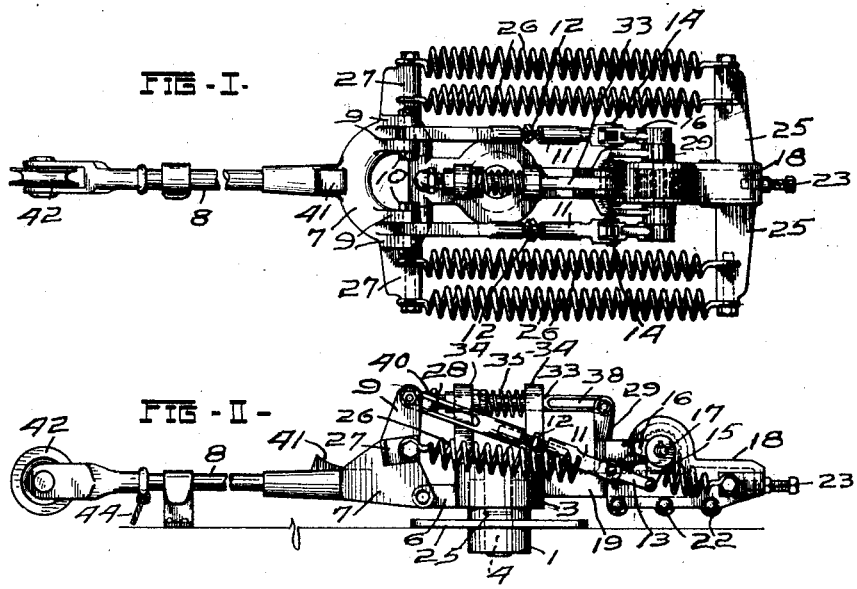
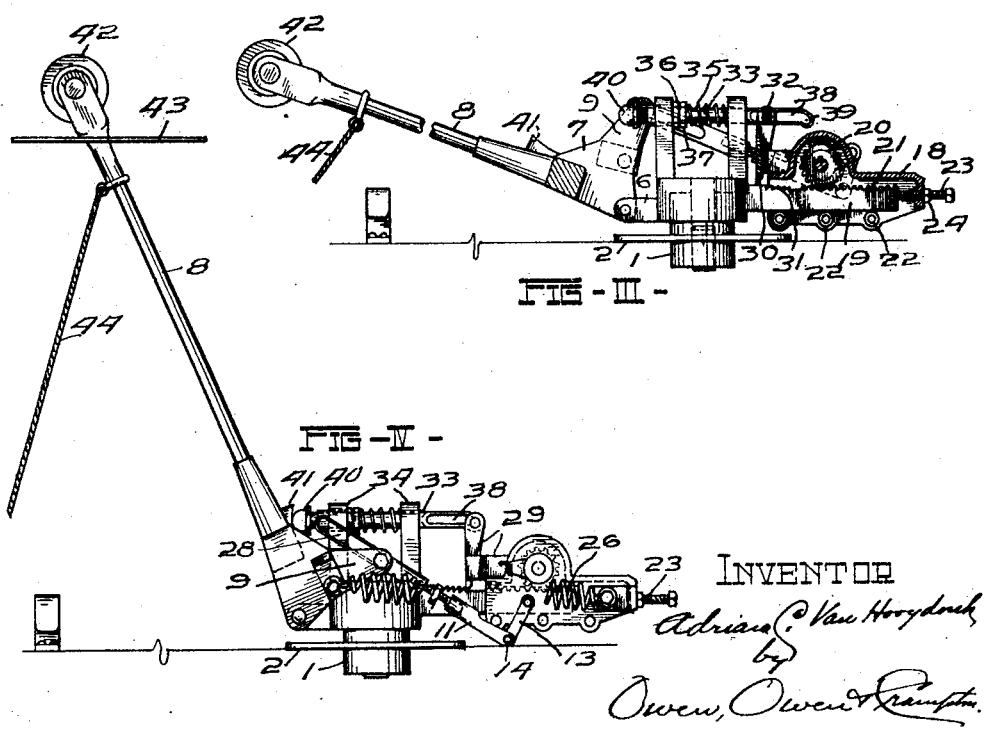
INVENTOR
Adrian C. Van Hooydonk
by
Owen, Owen & Crampton

UNITED STATES PATENT OFFICE.

ADRIAN C. VAN HOOYDONK, OF CANTON, OHIO.

TROLLEY RETRIEVER.

1,404,248. Specification of Letters Patent. Patented Jan. 24, 1922.

Application filed December 18, 1919. Serial No. 345,705.

*To all whom it may concern:*

Be it known that I, ADRIAN C. VAN HOOYDONK, a citizen of the United States, having taken out the first papers, and a resident of Canton, in the county of Stark and State of Ohio, have invented a certain new and useful Trolley Retriever; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to automatically retrieve the trolley wheel and pole commonly used in connection with electric railway systems for making electric connection between the car and the overhead wire. The invention particularly has for its object to provide a means that will prevent the destructive action produced by a trolley pole when the contact wheel jumps the wire. This destructive action is generally caused by the pole striking the cross supporting wires or overhanging wire brackets. In constructions containing my invention the trolley pole will, immediately upon the trolley wheel leaving the wire, drop to a safe position well below the wire and any cross supporting wires or bars. Means is also provided by my invention for restoring the elevating means for raising the pole and maintaining contact against the wire.

The invention may be contained in structures of different forms and such structures may vary in details of construction and yet such structures will contain my invention. For the purpose of illustrating a practical application of my invention I have selected one of such structures embodying my invention and shall describe it hereinafter. The structure selected is illustrated in the accompanying drawings.

Figure 1 of the drawings illustrates a top view of the trolley pole and mechanism for operating the same. Fig. 2 illustrates a side view of the structure illustrated in Fig. 1. Fig. 3 illustrates a side view of the structure, the parts of the mechanism being shown in position after the trolley has dropper to a safe position beneath the overhead wire. Fig. 4 illustrates the position of the mechanism when the trolley wheel has jumped the wire.

1, Fig. 2, is a supporting sleeve for the trolley pole and its controlling mechanism. It may be secured to the top of a car by any suitable means such as the flange 2 which may be bolted to the car. The sleeve 1 supports a frame 3 to which is connected a pin 4 that fits the sleeve 1. By this arrangement the frame 3 and the pole which is connected therewith may be rotated, the pin rotating within the sleeve 1. Longitudinal vertical movement of the pin 4 may be prevented by any suitable means such as by the bolt or rod 5 that extends through the sleeve 1 and a suitable channel in the pin 4. The means for securing the pin 4 in the sleeve 1 from vertical movements and yet so as to permit the rotative movements may be varied, the above being merely illustrative of a method for thus securing the pin 4.

The frame 3 is provided with a pair of lugs 6 to which the frame 7 which supports the pole 8 is pivoted. The frame 7 is provided with a plurality of arms 9 arranged preferably in pairs to which are pivotally connected by means of the bolts 10, the adjustable links 11. The links 11 are formed of three parts, the ends thereof being connected by a right and left hand threaded bar or pin 12 in each case. The lengths of the links 11 thus may be varied by rotation of the bar 12. Suitable locking pins or nuts may be provided for securing the threaded pins or bars 12 in their adjusted position.

The links 11 are connected to links 13 by means of bolts 14. The links 13 are connected to arms 15, which, with the arms 16 form bell crank levers. They are keyed to the shaft 17 which is supported in a housing 18.

The housing or frame 3 is provided with a bar 19 that extends into the housing 18. The shaft 17 is provided with a gear wheel 20 that meshes with a rack 21 formed on the bar 19. Rotation of the gear wheel 20 causes the housing 18 to move along the bar 19. In order to maintain the proper relation between the gear wheel 20 and the bar 19 and to reduce the friction of the movement of the housing relative to the bar 19, roller bearings 22 located on the other side of the bar 19 may be provided. Movement of the housing 18 relative to the bar 19 may be limited by means of the bolt 23 which may be adjusted and secured in its adjusted position by means of the nut 24. Rotation of the gear wheel 20 is produced by a rearward movement along the rack, that is, towards the supporting sleeve 1, and the return movement of the housing 18 is produced by the rotation of the bell crank levers having the arms 15 and 16 by the operation of the links 11 and 13. When the housing 18 is moved rearwardly the bell crank levers are rotated and the arms 16 fit between lugs or ears of the links through which the bolts 14 extend to connect the links 11 and 13, the ends of the arms 16 being provided with substantially semi-cylindrical recesses for fitting the bushings surrounding the bolts 14 and in between the ears formed on the ends of the links 13. The lengths of the links 13 are such as to extend between the outer ends of the arms 15 and 16. When, therefore, the links 11 are drawn rearwardly, the arms 16 are first operated upon to rotate the gear wheel 20 and when the arm 16 leaves or is about to leave the bushing surrounding the bolts 14, the links 11 operate upon the links 13 which are connected to the ends of the arms 15 to cause further rotation of the gear wheel 20. The rotation of the gear wheel 20 operating upon the rack 21, draws the housing 18 forward. The links may be drawn rearward to thus draw the housing 18 forward by pulling the trolley pole 8 down which will cause the arms 9 to pull on the links 11. The housing 18 is connected by means of arms 25 and the springs 26 to arms 27 formed on the frame 7. When the housing 18 is in its forwardmost position the springs 26 are under tension and will, if the trolley pole is released, raise the trolley pole so that connection may be made with the trolley wire, and will, moreover, maintain contact between the trolley wheel and the trolley wire. When, however, the trolley pole is raised, the links 11 may be returned in the forward direction. I have, however, provided slots 28 located in the ends of the links 11 through which the bolts 10 extend so as to allow a certain amount of movement of the bolts 10 and consequently of the arms 9 along the links 11.

During the upward movement of the pole 8 by the operation of the springs 26, the housing 18 is secured in its forward position. The housing 18 is provided with a right angular arm 29 that is bifurcated and is pivotally supported on the shaft 17 and between the bell crank levers and the housing 18. The right angular arm 29 is provided with a dog 30 that is located above the bar 19. The bar 19 is provided with ratchet teeth 31 and in position to be engaged by the dog 30 so that when the housing 18 is forced to its forward position, the dog 30 engages the rack 31 to hold in that position and thus holds the springs 26 under tension to raise the pole and maintain contact between the trolley wheel and the trolley wire.

The right angular arm 29 is provided with a bolt 32 which extends through a slotted bar 33. The bar 33 is supported in standards or arms 34 formed on the housing or frame 3. The bar is spring pressed rearwardly by means of the spring 35 which operates between one of the arms 34 and a sleeve 36 that is threaded onto one end of the bar 33. The sleeve 36 forms a bushing that moves in the rear arm 34. The sleeve 36 thus forms an adjustable stop as well as a bearing for the bar 33. The sleeve 36 is locked in its adjusted position by means of a nut 37. The slot 38 through which the bolt 32 extends is provided with sides that have their ends inclined downward so as to form a cam to lower the bolt 32 and consequently the pivoted arm 29. The cam slot thus lowers the dog 30 forming a part of the arm 29 to permit it to engage with the ratchet 31 when the bolt 32 reaches the end 39 of the slot 38. If, however, the rod 33 is pushed forward the cam slot will raise the bolt 32 and the dog 30 and release the dog 30 from the ratchet 31 which will permit the housing 18 to move rearwardly by the operation of the springs 26.

The end of the rod 33 is provided with a knob 40 which is threaded on to the end of the rod and the frame 7 is provided with a lug 41 so located that when the frame 7 rises to a certain position, predetermined by the adjustments of the mechanism, the lug 41 will strike the knob 40. Thus when the trolley wheel 42 jumps the trolley wire 43 and moves a short distance above the trolley wire 43 by the operation of the springs 26, the lug 41 strikes the knob 40, moves the rod 33 forward against the springs 35 and causes the cam slot 38 to operate upon the bolt 32 and the dog 30 to immediately release the housing 18 which under the operation of the springs 26 moves forward and allows the pole 8 to drop to such a position that the trolley wheel 42 will be held midway between the trolley wire 43 and the top of the car, that is, to about the position shown in Fig. 3. When the trolley pole drops thus to a point beneath the trolley wire 43 the bolts 10 move along the slots 28 to the outer ends of the links 11 which supports the trolley pole in this position below the trolley wire.

To restore the tension of the springs 26 the trolley pole 8 is pulled down by means of the cable 44 which is usually attached to the trolley pole in the manner well known in the art. This downward movement of the trolley pole 8 causes the arms 9 to pull on the links 11 which operate upon the arms 16 and subsequently on the arms 15 to cause rotation of the gear wheel 20 and thus the housing 18 is forced back against the tension of the springs 26 until the dog 30 again engages the ratchet 31 which occurs when the bolt 32 reaches the end of the cam slot 38. The springs 26 having been placed under tension, the ends thereof having been drawn apart in the manner described, the connection between the trolley wheel and the wire may be reestablished.

I claim:—

1. In an automatic trolley retriever, a trolley pole, a spring member connected to the trolley pole, a rack and pinion for increasing the tension of the spring for raising the pole to the wire and operated by movement of the trolley pole, a means for locking the rack and pinion in their relative positions, and means for releasing the locking means when the trolley wheel leaves the wire.

2. In an automatic trolley retriever, a trolley pole, a spring member connected to the trolley pole, a rack and pinion for increasing the tension of the spring for raising the pole to the wire and operated by movement of the trolley pole, a ratchet and dog for locking the pinion and rack in their relative positions and means for releasing the dog from the ratchet when the trolley wheel leaves the trolley wire.

3. In an automatic trolley retriever, a spring member connected to the trolley pole, a gearing having one of the gears connected to the spring member for increasing the tension of the spring member to raise the trolley pole to the wire and operated by movement of the trolley pole, and means for locking the gearing in their relative positions.

4. In an automatic trolley retriever, a spring member connected to the trolley pole, a gearing having one of the gears connected to the spring member for increasing the tension of the spring member to raise the trolley pole to the wire and operated by movement of the trolley pole, means for locking the gearing in their relative positions, and means for unlocking the gearing when the trolley leaves the trolley wire.

5. In an automatic trolley retriever, a spring member connected to the trolley pole, a gearing having one of the gears connected to the spring member for increasing the tension of the spring member to raise the trolley pole to the wire and operated by movement of the trolley pole, means for locking the gearing in their relative positions, means for unlocking the gearing when the trolley leaves the trolley wire, and means for operating the gearing to restore the tension of the wire by a movement of the pole.

6. In an automatic trolley retriever, a spring member connected to the trolley pole, a gearing having one of the gears connected to the spring member for increasing the tension of the spring member to raise the trolley pole to the wire and operated by movement of the trolley pole, means for locking the gearing in their relative positions, means for unlocking the gearing when the trolley leaves the trolley wire, and means for operating the gearing to restore the tension of the wire by downward movement of the pole.

7. In an automatic trolley retriever, a trolley pole, a spring having one end permanently connected to the trolley pole, a frame, a rack connected to the other end of the spring, a gear wheel located in the frame and operating on the rack for increasing the tension of the spring and operated by lowering the trolley pole.

8. In an automatic trolley retriever, a trolley pole, a spring member connected to the trolley pole, a pinion, means for connecting the pinion to the spring member, a rack, and means for shifting the pinion along the rack for increasing the tension of the spring member to raise the trolley pole to the wire.

9. In an automatic trolley retriever, a supporting member, a trolley pole pivoted to the supporting member, a rack connected to the supporting member, a pinion movable over the said rack, a spring connected to the trolley pole, a member for connecting the said spring with the pinion, an arm connected to the said pinion, a link operative on the said arm and connected to the said trolley pole for causing movement of the pinion and member away from the trolley pole, a dog connected to the said member for engaging the said rack, means operated by the trolley pole for releasing the dog to release the tension of the spring and to permit the pole to drop from the trolley wire.

10. In an automatic trolley retriever, a supporting member, a trolley pole pivoted to the supporting member, a rack connected to the supporting member, a pinion movable over the said rack, a housing for containing the pinion, a spring connected to the said housing and to the trolley pole, arms connected to the said pinion, links operative on the said arms in succession and connected to the said trolley pole for causing movement of the pinion and housing away from the trolley pole, a dog for interengaging the said rack and housing, a spring pressed member operated by the trolley pole when the trolley wheel leaves a wire for releasing the dog.

In testimony whereof I have hereunto signed my name to this specification.

ADRIAN C. VAN HOOYDONK.